Oct. 13, 1953 T. R. WIESEMAN 2,655,613
ROTOR FOR DYNAMOELECTRIC MACHINES
Filed Jan. 24, 1952 2 Sheets-Sheet 1
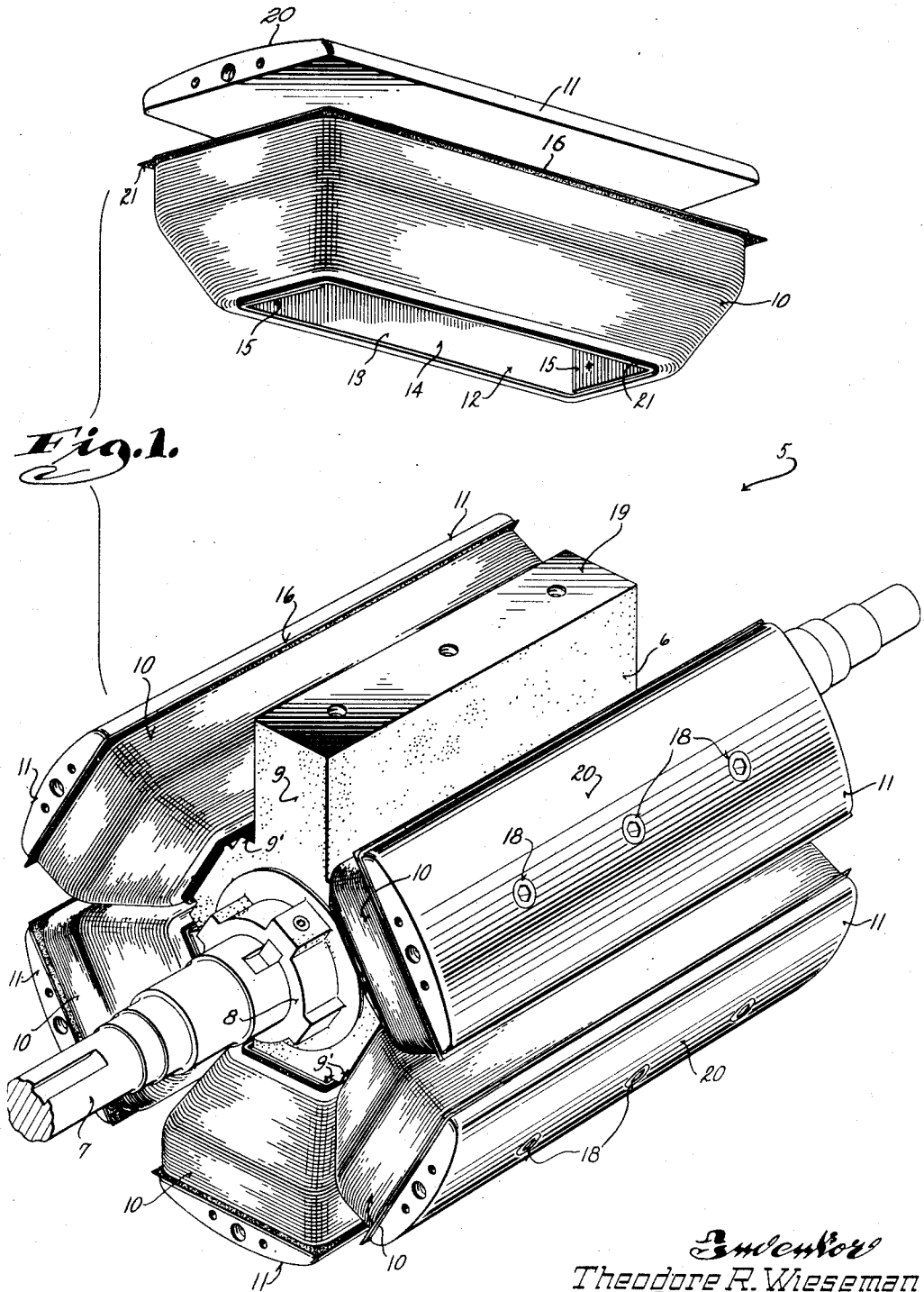

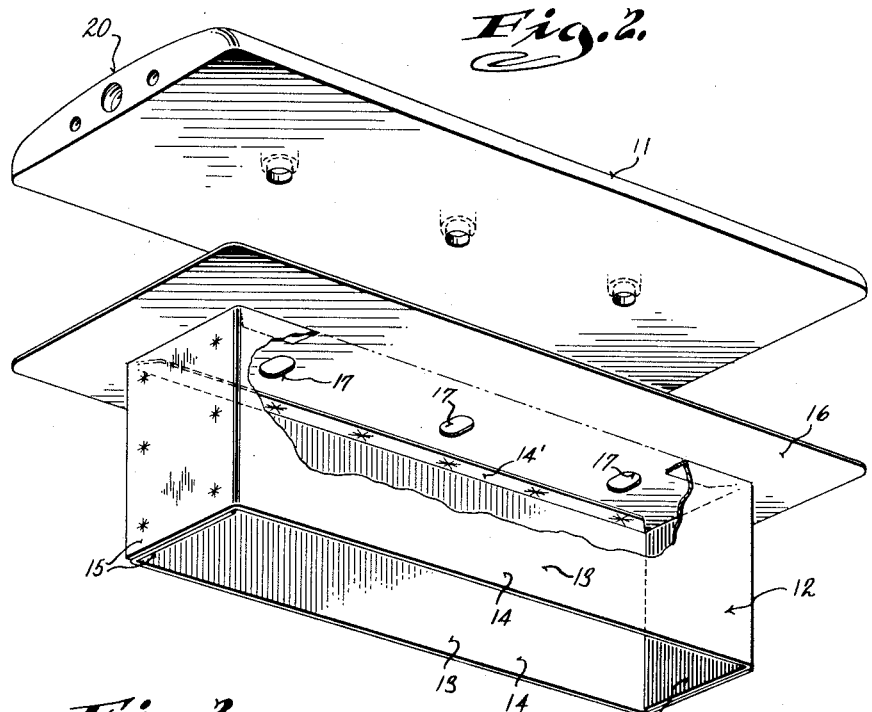
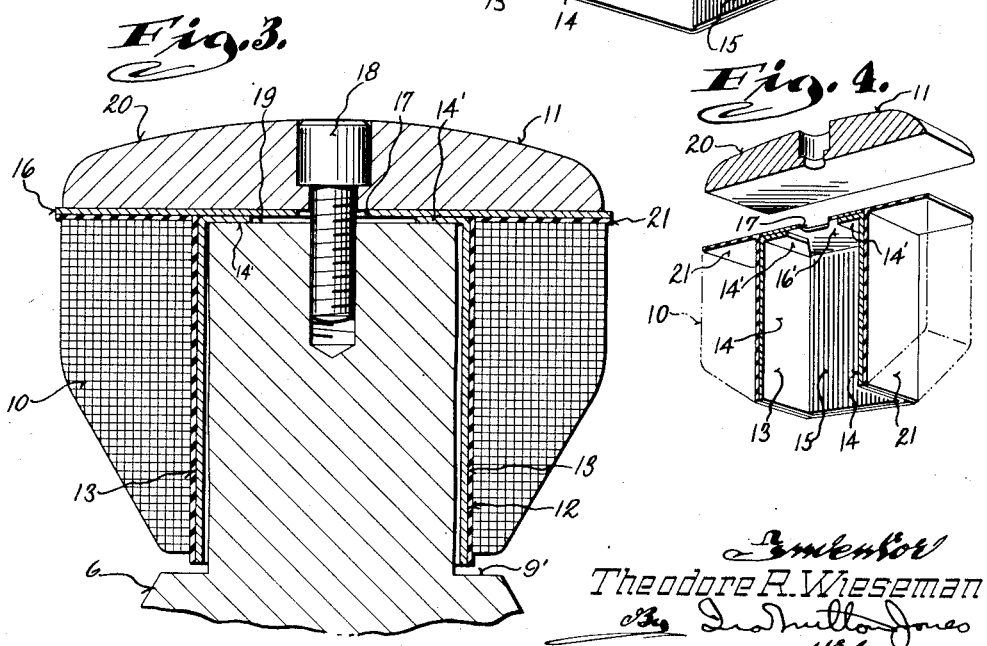

Patented Oct. 13, 1953

2,655,613

UNITED STATES PATENT OFFICE 2,655,613

ROTOR FOR DYNAMOELECTRIC MACHINES

Theodore R. Wieseman, Milwaukee, Wis., assignor to The Louis Allis Company, Milwaukee, Wis., a corporation of Wisconsin Application January 24, 1952, Serial No. 268,033

4 Claims. (Cl. 310—194)

This invention relates to dynamo electric machines and as in the copending application of Theodore R. Wieseman Serial Number 168,545, now abandoned of which this application is a continuation in part, refers more particularly to the rotor of heavy duty electric motors, generators and alternators. In certain types of these machines, the rotor is equipped with wound field coils. These coils are mounted on the arms of spider-like cores which may be laminated but are generally cast as one piece. In any event each arm constitutes one of the several electromagnetic poles of the rotor.

The coils mounted on these arms or poles have their loops lying in planes substantially parallel to the rotor axis and each arm has a pole shoe fixed to its radially outer end, the outer face of the pole shoe being curved substantially concentrically with the rotor axis. The pole shoes extend beyond or overhang the sides of the poles to properly distribute the magnetic flux about the rotor and at the same time provide shoulders or abutments which prevent the coils from being thrown off the rotor by centrifugal force.

Heretofore the coils were wound upon a form, removed therefrom and slipped onto the pole, and thereafter the pole shoe was secured in position. To enable the coils to be applied to the rotor in this manner the forms upon which they were wound were larger than the rotor arms. This was especially necessary where the rotor cores were cast due to the relatively rough and uneven surfaces of the casting. It was, therefore, always necessary to wedge shims of insulating material between the coil and the side and end faces of the rotor arms in an attempt to hold the coils against shifting, but it was always difficult to obtain a tight fit between the winding and the pole upon which it was mounted since the wedges could not be driven tightly without danger to the coil.

Another disadvantage of this past practice resided in the fact that it precluded impregnating the coils with insulative material and baking them hard since the coils had to be yieldable to enable them to be clamped between the undersides of the pole shoes and the bottoms or roots of the arms in an effort to overcome the deficiencies of the shimming and secure as firm a mounting as possible.

Still another disadvantage of this past manner of mounting the coils was that the coils could not be readily stocked for replacement purposes since the need for keeping them relatively pliable made them susceptible to damage by the usual handling incidental to storage.

The present invention overcomes all these difficulties in a practical and inexpensive manner, and to this end it is an object of this invention to mount the coil upon a form or bobbin which becomes a permanent part of the rotor so that the coil can be wound tightly and impregnated and baked solid and hard.

Another object of this invention is to secure the form or bobbin with the coil thereon in place upon the pole by the simple expedient of attaching the pole shoe to the pole; but since it is important that the pole shoes be accurately spaced apart despite the fact that the angular spacing of the poles, at least in the case of a cast rotor, often is not uniform, this invention has as a further object to so clamp a portion of the bobbin between the pole and the pole shoes that despite the fact that the bobbin aligns itself with the pole the pole shoe can be secured in the proper position to assure correct angular spacing between it and its adjacent pole shoes.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate two complete examples of the physical embodiments of the invention constructed according to the best modes so far devised for the practical application of the principles thereof, and in which:

Figure 1 is a perspective view of the rotor of a dynamo electric machine having the coil assemblies of this invention installed thereon, one of the coil assemblies being shown disassembled from the rotor;

Figure 2 is a perspective view of the naked coil form and the pole shoe separated from one another;

Figure 3 is a cross sectional view through one of the poles of a rotor having the coil assembly of this invention installed thereon; and Figure 4 is a separated perspective view of a portion of a coil form and pole shoe illustrating a modified embodiment of the coil form shown in Figure 2.

Referring now to the accompanying drawings, the numeral 5 designates generally a six pole rotor for a dynamo electric machine, and more specifically a heavy-duty alternator, which is illustrative of the type of equipment to which this invention is especially applicable, The core 6 of the rotor which may be laminated but is generally formed as a unitary casting, is mounted on a shaft 7 and has a hub-like center or body portion 8 and six spoke-like arms or poles 9 extending radially therefrom. Each of the six poles has a coil or winding 10 mounted thereon. Heretofore these windings would have been installed directly on the arm or pole, being held against lateral shifting thereon by shims of insulating material wedged between the coil and the sides and ends of the pole and held in place by being clamped between the underside of a pole shoe 11 and the roots 9' of the rotor arms. As brought out hereinbefore the mounting and securement of the coil in this manner has many disadvantages which the present invention overcomes.

With this invention, instead of winding the coil loosely upon a form or bobbin and then slipping it off the form and onto the arm or pole as was done in the past, the winding 10 is tightly wound upon a form or bobbin 12 which slips onto the pole.

The bobbin 12 comprises a rectangular shell of stiff sheet metal formed of two identical stampings 13, each having a long side wall 14 and a pair of short end walls 15. The end walls of the two stampings overlap and are spot-welded together and the long side walls have inturned flanges 14' which are spot-welded to a rectangular end plate 16. This results in a rigid box-like unit of a size to fit snugly though easily over the rotor arm or pole, and since the end plate 16 is larger than the cross sectional size of the shell and is centered thereon it provides overhanging flanges against which the coil or winding bears.

The bobbin with the coil thereon is secured in place upon the rotor pole by the simple expedient of clamping the plate 16 and the flanges 14' between the underside of the pole shoe and the machined outer flat face 19 of the pole, the pole shoe being secured in place in the usual manner as by cap screws 18. It is important to observe that the height of the shell or bobbin is less than the radial length of the arm or pole so that when the bobbin is in place thereon its inner edges are still spaced from the roots 9' of the rotor pole.

The pole shoe, as is customary, is made of magnetically permeable material and is rectangular in outline and substantially larger in both length and width than the machined outer face of the pole, and preferably, though not necessarily, the underside of the pole shoe and the plate 16 are coextensive in size and shape. The upper surface 20 of the pole shoe is curved, in transverse section, to an arc substantially concentric with the axis of the rotor.

Where the poles are accurately and uniformly angularly spaced the pole shoes are correctly related to one another when they are symmetrical with the poles as in Figure 3, but if the poles are not uniformly spaced apart as is often the case with cast rotors the pole shoes must be displaced from symmetry with the poles in one direction or the other and to allow such displacement the holes 17 in the plate 16 through which the cap screws pass are transversely elongated as shown. This allows the bobbin with the coil to center itself upon the pole and at the same time enables the screws which hold the pole shoe upon the pole to enter the pole wherever necessary to fasten the pole shoe in a position required to secure uniform angular spacing between the pole shoes, bearing in mind that the bolt holes in the shoe through which the screws pass are always centered therein.

In applying the winding 10 to the form or bobbin 12, the side and end walls of the latter as well as the underside of the plate 16, are first covered with a suitable layer of insulation 21, and the successive loops are so laid that the finished winding has a tapered form with the smaller end of the coil adjacent to but spaced slightly from the open end of the bobbin shell. This permits close juxtapositioning of adjacent windings and precludes the application of endwise pressure upon the coil. The loops are drawn tight and the finished coil is then impregnated with insulative varnish and baked hard. This produces a winding unit which is easily installed and which may be stocked for replacement without danger of being damaged.

For convenience in winding the coil and also to provide maximum protection against deformation of the winding during handling prior to application of the wound bobbin upon the core, the plate 16 is large enough to provide the overhanging supporting flanges shown, but these flanges can be omitted. Thus, in the slightly modified embodiment of the invention illustrated in Figure 4, the plate 16' does not protrude beyond the walls 14 and 15. In winding the coil it is, therefore, necessary to mount the bobbin upon a suitable supporting plate, not shown, which supports the large end of the coil and the layer of insulation 21 adjacent thereto. After the coil is impregnated with varnish and baked it will, of course, retain its shape during all normal handling despite the omission of the supporting flanges.

From the foregoing description taken in connection with the accompanying drawings, it will be readily apparent that this invention greatly simplifies the application of the windings onto the poles of a wound type rotor and in addition provides a more reliable and generally better construction.

What I claim as my invention is:

1. In a dynamo-electric machine, a magnetically permeable rotor comprising: a hub portion and a plurality of angularly spaced arms projecting radially therefrom, each of said arms being rectangular in cross section and providing a pole for the rotor; a magnetically permeable pole shoe for each of said poles of a size and shape to overlie the radially outer face of its pole and to project beyond the edges thereof; a stiff sheet metal box-like bobbin for each pole, each of said bobbins having side and end walls defining a shell of a size to snugly but freely fit onto a pole and an end plate secured to one end of the shell to overlie the radially outer face of the pole when the bobbin is in place thereon, and the axial length of the shell being less than the radial length of the poles so that when the bobbin is in place upon a pole with the end plate thereof bearing against the radially outer face of the pole the radially inner end of the shell is spaced from the roots of the pole; a winding on each bobbin with the loops thereof wound about the shell and one axial end of the winding lying in the plane of the end plate and the opposite end of the winding spaced from the adjacent end of the shell; and means for detachably securing each pole shoe in place upon a pole, said means drawing the pole shoe toward the radially outer face of the pole and tightly clamping the end plate of the bobbin therebetween to thereby secure the bobbin to the pole with the side walls of the shell overlying the sides of the pole but spaced from the roots of the pole, said means for drawing the pole shoes toward the poles and holding them in place being independent of the bobbin so that inaccuracies in the angular spacing of the poles need not interfere with correct and uniform angular spacing of the pole shoes.

2. In a dynamo-electric machine the combination set forth in claim 1 wherein the pole shoes are secured in place by screws passed through the pole shoe and the end plate of the bobbin and threaded into the pole, further characterized by the fact that the holes in the end plate of each bobbin through which the fastening screws pass are transversely enlarged so that inaccuracies in the angular spacing of the poles need not interfere with correct and uniform spacing of the pole shoes.

3. In a dynamo-electric machine, the structure set forth in claim 1 further characterized by the fact that each winding is of uniform cross section for a distance in from its end which lies in the plane of the end plate of its bobbin and is taperingly smaller from its portion of uniform cross section toward its opposite end which is adjacent to the roots of the pole, so that the bobbins with their windings thereon can be mounted upon angularly closely adjacent rotor poles without interfering with one another.

4. A winding for the rotor of a dynamo-electric machine having angularly spaced radially extending arms providing poles, comprising: a stiff sheet metal bobbin having a shell consisting of pairs of parallel side and end walls and an end plate secured to one end of the shell and projecting laterally therefrom to provide a coil supporting flange; and a coil of wire wound tightly about the shell with the loops thereof at one end of the coil bearing against the flange, and at the other end of the coil spaced from the adjacent end of the shell, and the outer surface of the coil being generally parallel with its axis for a distance in from its end which bears against the flange and for the balance of the coil tapering inwardly toward its opposite end, so that said windings can be mounted upon angularly closely adjacent rotor poles without interfering with one another.

THEODORE R. WIESEMAN.

References Cited in the file of this patent

UNITED STATES PATENTS

| Number | Name | Date |
|---|---|---|
| 571,462 | Thomson et al. | Nov. 17, 1896 |
| 1,502,527 | Reichel et al. | July 22, 1924 |

FOREIGN PATENTS

| Number | Country | Date |
|---|---|---|
| 126,561 | Germany | Dec. 19, 1901 |
| 436,789 | Germany | Nov. 9, 1926 |